(12) United States Patent
Mequanint et al.

(10) Patent No.: US 6,221,955 B1
(45) Date of Patent: Apr. 24, 2001

(54) POLYURETHANE RESINS

(75) Inventors: Kibret Mequanint; Ronald Douglas Sanderson, both of Cape Province (ZA)

(73) Assignee: Dekro Paints (Proprietary) Limited, Kuils River (ZA)

( * ) Notice: Subject to any disclaimer, the term of this patent is extended or adjusted under 35 U.S.C. 154(b) by 0 days.

(21) Appl. No.: 09/207,967

(22) Filed: Dec. 9, 1998

(30) Foreign Application Priority Data

Dec. 9, 1997 (ZA) .................................................. 97/11042

(51) Int. Cl.$^7$ ............................... C08J 3/00; C08K 3/20; C08L 75/00; C08G 18/00; C08G 18/28

(52) U.S. Cl. .................. 524/591; 427/372.2; 427/385.5; 427/388.1; 428/423.1; 428/425.8; 524/589; 524/590; 524/539; 524/839; 524/840; 528/44; 528/72

(58) Field of Search ..................... 524/589, 590, 524/591, 539, 839, 840; 528/44, 72; 427/372.2, 385.5, 388.1; 428/423.1, 425.8

(56) References Cited

FOREIGN PATENT DOCUMENTS

| 2084737 | 6/1993 | (CA) . |
|---|---|---|
| 3532865 | 4/1987 | (DE) . |
| 4221678 | 1/1994 | (DE) . |
| 0548727 | 6/1993 | (EP) . |
| 61-47721 | 3/1986 | (JP) . |
| 2-150479 | 6/1990 | (JP) . |

OTHER PUBLICATIONS

Odian, G., Principles of Polymerization, 1981, pp. 20–25.*
Chemical Abstracts of JP6147721 dated Nov. 1986, vol., 105, No. 20.
Kakati, D.K., et al. "Polyurethane Ionomers Containing Phosphate Groups."Polymer, vol. 34, No. 20(1993) pp 4319–4324.
Kakati, D. K., et al. "New Polyurethane Ionomers Containing Phosphonate Groups." Polymer, vol. 35, No. 2 (1994) pp 398–402.
Liaw, D., et al. "Phosphorus–Containing Polyurethanes Based on Bisphenol–S, Prepared by N–Alkylation." Eur. Polym. J., vol. 32, No. 12 (1996) pp 1377–1380.
Derwent Abstract of JP 2150479 dated Jun. 8, 1990.

* cited by examiner

Primary Examiner—Patrick D. Niland
(74) Attorney, Agent, or Firm—Ladas & Perry

(57) ABSTRACT

A polyurethane resin consists of a reaction product of a phosphated polyol, a polyisocyanate and optionally a stabilizing monomer having a salt-forming group, for example, 2,2-dimethyolol propionic acid. The phosphated polyol may be a hydroxyl-terminated, phosphated polyester polyol which is a reaction product of a carboxylic acid, a polyol and a phosphate monomer. The phosphate monomer may be 2-phosphonobutane-1,2,4-tricarboxylic acid. The invention provides aqueous dispersions of phosphated polyurethane resins which are particularly suitable as metal primers for metals such as galvanised steel. The metal primers have improved adhesion under agressive enviroments.

21 Claims, 10 Drawing Sheets

(20%)

POLYURETHANE RESINS

This invention relates to polyurethane resins. In particular, it relates to polyurethane dispersions and to surface coatings such as metal primers containing the polyurethane dispersions.

According to the invention, there is provided a polyurethane resin which comprises a reaction product of:
- a first component comprising at least one phosphated polyol; and
- a second component comprising at least one polyisocyanate.

By a "phosphated polyol" is meant a polyol containing at least one phosphorus-containing reactive group, for example, a phosphonate anion. The polyurethane resin of the invention is thus a phosphated polyurethane resin.

Typically, the phosphated polyol is a polymeric or oligomeric polyol. The polyol may be selected from the group consisting of a polyester polyol, a polyether polyol, a polycarbonate-polyesterpolyol, a polyhydroxylated polybutadiene, and the like, and mixtures thereof. Generally, the molecular mass of the phosphated polyol may be In the range 500–3000, however, the molecular mass of the phosphated polyhydroxiated polybutadiene is generally in the range 20,000–50,000.

More particularly, the phosphated polyol is a hydroxyl-terminated, phosphated polyester polyol which is the reaction product of at least one carboxylic acid, at least one polyol and at least one organophosphorus monomer. By an organophosphorus monomer is meant a monomer containing at least one carbon-phosphorus covalent bond.

The carboxylic acid may be an aromatic, aliphatic, or cycloaliphatic polycarboxylic acid, for example, a $C_6$–$C_{10}$ polycarboxylic acid having two reactive COOH groups per molecule. The polycarboxylic acid may be selected from the group consisting of 1,4-cyclohexanedicarboxylic acid, hexanedioic acid, isophthalic acid, sebacic acid, azelaic acid, and mixtures thereof.

The particular carboxylic acid(s) used is selected according to the physical properties required in the ultimate phosphated, polyurethane resin, such as chain flexibility (e.g. hexanedioic acid) and hydrolytic resistance and hardness/flexibility balance (e.g. 1,4-cyclohexanedicarboxylic acid).

The polyol may be a polyhydric alcohol. Typically, the polyhydric alcohol is a $C_4$–$C_8$ polyhydric alcohol having at least two reactive primary OH groups per molecule. The polyhydric alcohol may be selected from the group consisting of 2,2-dimethyl-1,3-propane diol, 2-methyl-1,3-propane diol, 1,6-hexanediol, 1,1,1-tris(hydroxymethyl) propane, and mixtures thereof.

The particular polyol(s) used is selected according to the physical properties required in the ultimate phosphated polyurethane resin, such as branching and hence hardness (e.g. 2,2-dimethyl-1,3-propane diol).

The phosphate monomer may be a polycarboxylic acid, for example, 2-phosphonobutane-1,2,4tricarboxylic acid.

The phosphate monomer is selected to provide phosphate reactive groups in the main chain of the ultimate phosphated polyurethane resin to improve adhesion of the polyurethane resin to a metal by the formation of P—$O^-$/$M^{2+}$ ionic bonds.

The hydroxyl-terminated, phosphated polyester polyol may be the reaction product of 25–45% by mass of the carboxylic acid(s), preferably 37%; 40–53% by mass of the polyol(s), preferably 47%; and 5–20% by mass of the phosphate monomer, preferably 15%; the mass percentages being based on total solids of the reactants. When the carboxylic acid is a mixture of 1,4-cyclohexanedicarboxylic acid and hexanedioic acid, the respective amounts of these carboxylic acids may be 10–20%, preferably 15% and 15–25%, preferably 22%.

The hydroxyl-terminated, phosphated polyester polyol may have an acid number in the range 5–20 KOH/g, for example, 12 mg KOH/g, and a hydroxyl number in the range 130–180 KOH/g.

The phosphated polyurethane resin may be water-dispersible. To provide for water-dispersibility, the reaction mixture used to produce the phosphated polyurethane resin typically includes a stabilising monomer having at least one salt-forming group. Most conveniently, the phosphated polyurethane resin is made anionic, whereby the salt-forming groups are carboxylic acid groups which can subsequently be neutralized to salt form. In that case, the monomer can be a polyol having a carboxylic acid group, A preferred carboxyl group-containing diol is dimethylol propionic acid. The phosphate monomer 2-phosphonobutane-1,2,4tricarboxylic acid also contributes to the stability of the dispersion. In another embodiment of the Invention, said salt forming groups are not neutralised and said phosphated polyurethane resins can be applied as surface coatings in solution by dissolving them in an organic solvent. Suitable organic solvents include propylene glycol monomethyl ether acetate and ethylene glycol monoethyl ether acetate.

The concentration of salt-forming groups is chosen so as to provide stability to an aqueous dispersion of the phosphated polyurethane resin in water. This will vary in accordance with the hydrophilicity of the particular resin. The concentration of the stabilising monomer may be in the range 3–8% by mass, for example, 3.6%.

When the stabilising monomer is dimethylol propionic acid, the reaction mixture for preparing the phosphated polyurethane resin typically includes a solvent such as N-methyl pyrrolidone.

The polyisocyanate may be, for example, toluene diisocyanate. Hexamethylene diisocyanate or isophorone diisocyanate, or any derivatives thereof, are also suitable polyisocyanates. Mixtures of said polyisocyanates may also be used.

The water-dispersible, hydroxyl-terminated, phosphated polyurethane resin may be the reaction product of 60–80% by mass of the phosphated polyol, preferably 75%; 15–25% by mass of the polyisocyanate, preferably 22%; and 3–8% by mass of the stabilising monomer, preferably 3.6%; the mass percentages being based on total solids of the reactants. Typically, the molecular mass of the polyurethane resin is in the range 8000–10,000.

The invention extends to a method of preparing a polyurethane resin which comprises reacting together a first component comprising at least one phosphated polyol and a second component comprising at least one polyisocyanate.

The method may comprise reacting together the first and second components and a third component comprising at least one stabilising monomer having at least one salt-forming group.

The phosphated polyol, the polyisocyanate, and the stabilising monomer, and the relative proportions thereof, etc. may be as described above.

The anionic, water-dispersible, phosphated polyurethane resin may be prepared by reacting the polyisocyanate with the hydroxyl-terminated, phosphated polyester polyol at an elevated temperature until all the polyisocyanate is reacted. The polyisocyanate and the polyol component are suitably reacted in such proportions that the ratio of equivalents of isocyanate groups to equivalents of hydroxyl groups is in the range 0.8:1 to 0.95:1, preferably 0.85:1, and such that the polyurethane resin has terminal hydroxyl groups.

The invention further extends to a composition comprising a resin as described above, and a liquid carrier for the resin. The liquid carrier may be water or an organic solvent. The resin can be applied as a coating in solution form.

Typically, the liquid carrier is water, the composition being in the form of an aqueous dispersion comprising the resin dispersed in the water.

Optionally, the composition contains additives such as surfactants, flow-promoters, plasticizers, anti-foams, etc.

Thus, the invention provides a polyurethane dispersion comprising the water-dispersable, hydroxyl-terminated, phosphated polyurethane resin as described above, dispersed in water.

Before the polyurethane resin is dispersed in water, an amine, preferably a tertiary amine such as triethylamine or triethanolamine, is added to the mixture in an amount sufficient to substantially neutralize the pendant carboxylic acid groups. The amine is added at about 0.8–1 % amine equivalent per equivalent of carboxyl functionality, preferably about 1:1 (in other words, between 80% and 100% neutralisation). Amines that may be used for neutralization are relatively volatile so that they may evaporate from a coating upon curing. The polyurethane resin may be dispersed in water using techniques well known in the art. Preferably, the mixture is added to the water with agitation, or, alternatively, water may be stirred into the mixture. The polyurethane dispersions typically comprise 30–40 mass % solids, preferably 35%.

The invention extends to the application of said phosphated polyurethane compositions and dispersions as coating compositions, for example, as surface coatings and in particular as primer coats for metals such as galvanised steel. Generally, a coating of the aqueous dispersion contains a thermally activated crosslinking or curing agent commonly used for polyurethane coatings, such as alkoxylated melamine derivatives (e.g. water-soluble melamine resins). Generally, an aqueous polyurethane dispersion primer coat applied in a coil coating process is dried and cured at temperatures ranging from 170° C. to 245° C. for times ranging from 20 s to 6 min.

The invention extends to a method of protecting a metal substrate form degradation which comprises treating the metal substrate with at least one coat of a metal primer as described above.

Thus, phosphated thermosetting polyurethane dispersions having terminal hydroxyl groups have been synthesised from a polyester polyol soft segment modified with a novel phosphate monomer and a diisocyanate. In experiments and studies described below, the Applicant has shown that in the metal primer coatings of the invention the reactive phosphoric acid groups migrate to the metallcoating interface and form an Insoluble metal phosphate layer. In the process of sputtering samples with argon ions, the phosphorus content is increased from 2.2% at the top surface to 4.4% at the metal/coating interface.

These primer coatings exhibit strong adhesion under aggressive environments, which can be explained in terms of the functional groups present in the phosphated resin. Without being bound by theory, the Applicant believes that the functional groups that can interact with the metal surface are P—OH, P—O$^-$ and P=O to produce a metal phosphate layer. The dissociated P—O$^-$ in the resin system can form the ionic bond P—O—Zn$^{2+}$ with the metal. The strong adhesion of these coatings suggest acid-base interaction via the zinc layer of the metal and the resin chain phosphoric acid groups to form P—O$^-$/Zn$^{2+}$ rather than induced dipole interaction of the P=O/M complex type. The resin derived from the phosphate monomer contains reactive functional groups. The presence of these functional groups have been verified by infrared spectroscopy in the experiments described below.

The bonding strength of P—O/metal(M) is ionic in nature and is stronger than the P=O/metal bond which Is Induced dipole. When the reactive groups of the phosphated polymer is of the type P—OH, it is essential that these groups dissociate to P—O$^-$. This means that the addition of water to the system promotes dissociation and increases the deposition time. Conversely, the formation of metal phosphate in its crystalline form requires the addition of water.

The formation of a non-conductive metal phosphate layer at the metal interface improves corrosion resistance, when the phosphated resin dispersion, is used as a primer coat to untreated metal as a phosphating process. The thickness of the insoluble metal phosphate at the metal interface depends on the amounts of phosphate monomer used and in contrast to a pre-treatment process, a complete coverage of the metal by metal phosphate is achieved. Thus, the primer coat of the invention provides a self-phosphating coating.

It is an advantage of the present invention that the aqueous, phosphated polyurethane dispersions described above can be used for metal primer coatings. Aqueous, unphosphated polyurethane dispersions known to the Applicant have not been used successfully for metal primer coatings due to bad wetting and poor adhesion to the metal. In contrast, protective primer coatings comprising said aqueous dispersions of the present invention have improved wetting and improved wet-adhesion. The cured primer coatings also have improved swellability. It is a further advantage of the invention that the aqueous phosphated dispersions of the invention have more uniform particle size distributions than said aqueous unphosphated polyurethane dispersions known to the Applicant.

As previously indicated, said phosphated polyurethane resins need not be neutralised and can be applied in a liquid carrier in solution form. Accordingly, the invention further extends to a polyurethane solution comprising the unneutralised, hydroxyl-terminated, phosphated polyurethane resin described above, dissolved in an organic solvent. The invention also extends to compositions, for example, coating compositions, comprising said solutions.

The invention still further extends to a polyol containing at least one phosphorus-containing reactive group for use in the preparation of a thermosetting resin, for example, a polyurethane resin. The phosphorus-containing reactive group may be a phosphonate anion.

The polyol may be a reaction product of at least one carboxylic acid, at least one polyol, and at least one phosphate monomer. The carboxylic acid, the polyol and the phosphate monomer, the relative proportions thereof, etc. may be as described above.

A schematic representation of a preferred hydroxyl-terminated, phosphated polyester polyol, which is a reaction product of 1,4-cyclohexanedicarboxylic acid, hexanedioic acid, 2,2-dimethyl-1,3-propane diol and 2-phosphonobutane-1,2,4tricarboxylic acid, is as follows.

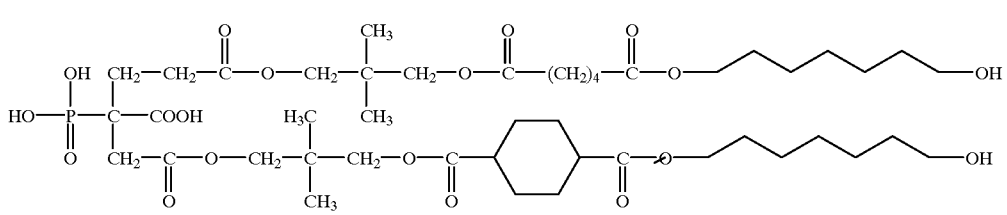

Thus the invention also extends to a thermosetting resin comprising said phosphated polyol, for example, said phosphated polymeric or oligomeric polyol. The phosphated polyol is admixed with a curing or cross-linking agent. Suitable curing or cross-linking agents are melamine derivatives, e.g. alkoxylated melamine derivatives. Thus, thermosetting, phosphated polyester resins can be prepared in this way.

The invention will now be further described, without limitation of the scope of the invention, with reference to the following non-limiting illustrative examples, experiments, studies and drawings.

EXAMPLE 1

Figure 1:
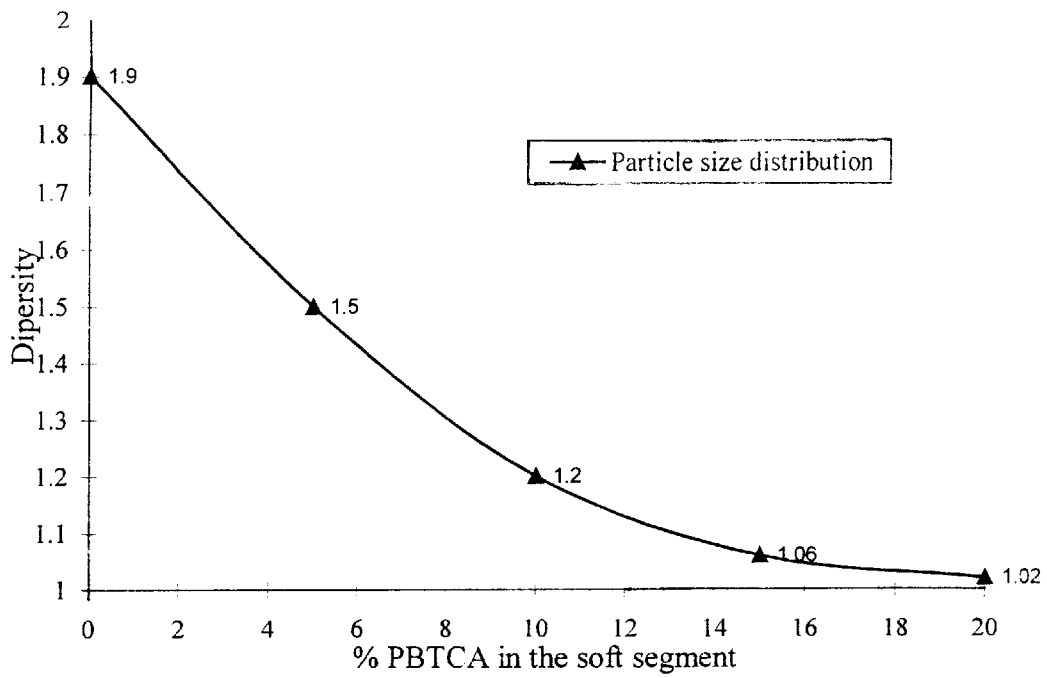
FIGS. 1–7 show graphical representations of particle size distribution versus percentage amount of PBTCA (2-phosphonobutane-1,2,4-tricarboxylic acid) in particle size studies.
Figures 2, 3:
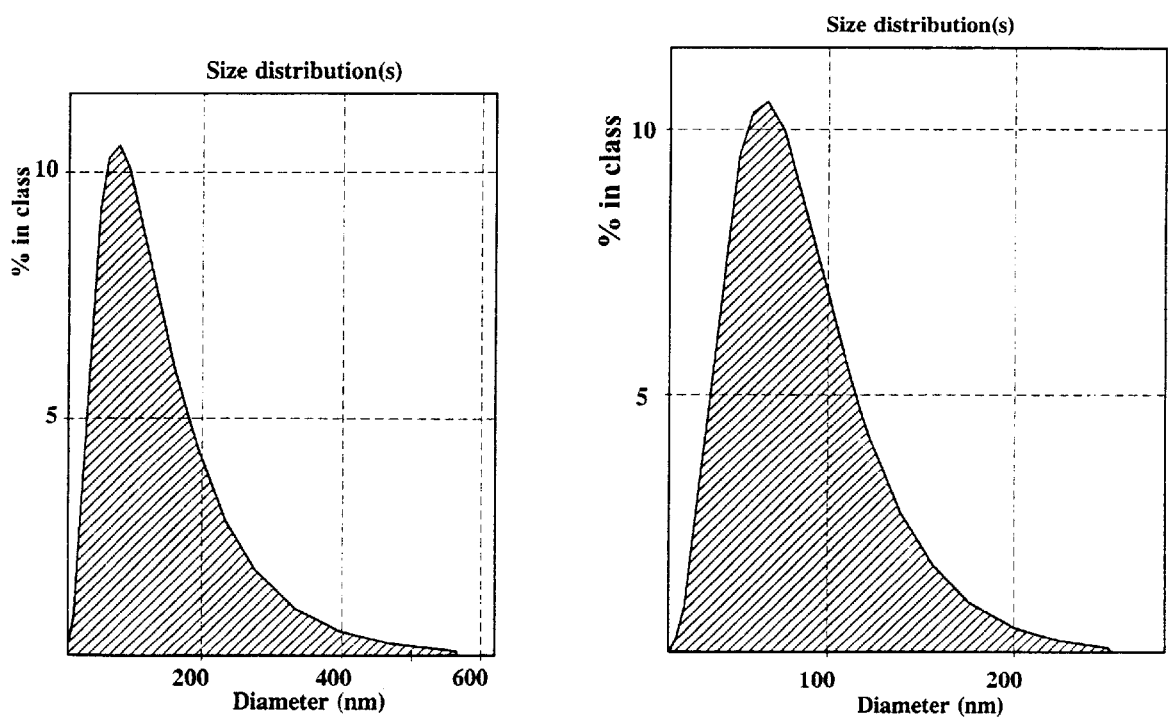
Figure 4:
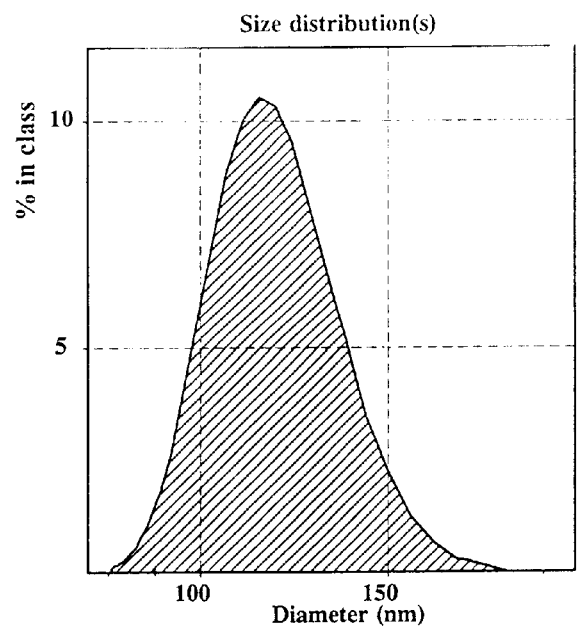
Figure 5:
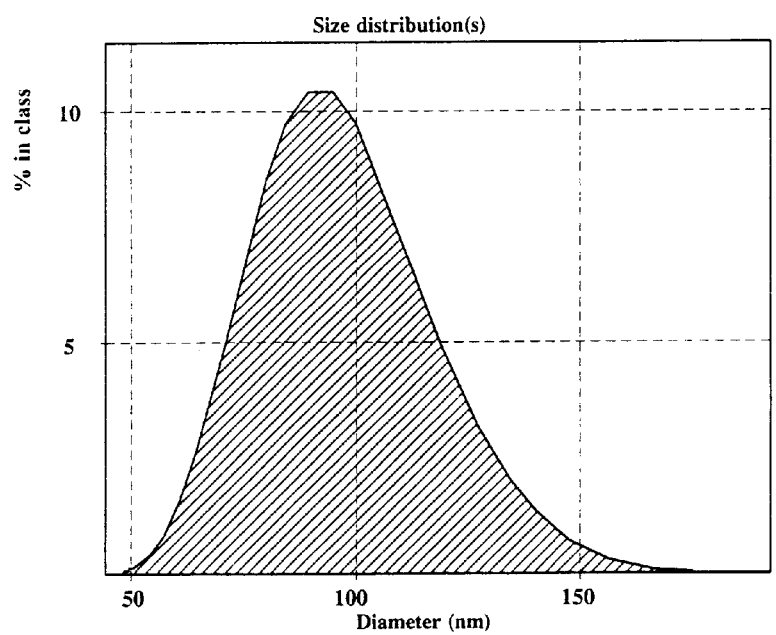
Figure 6:
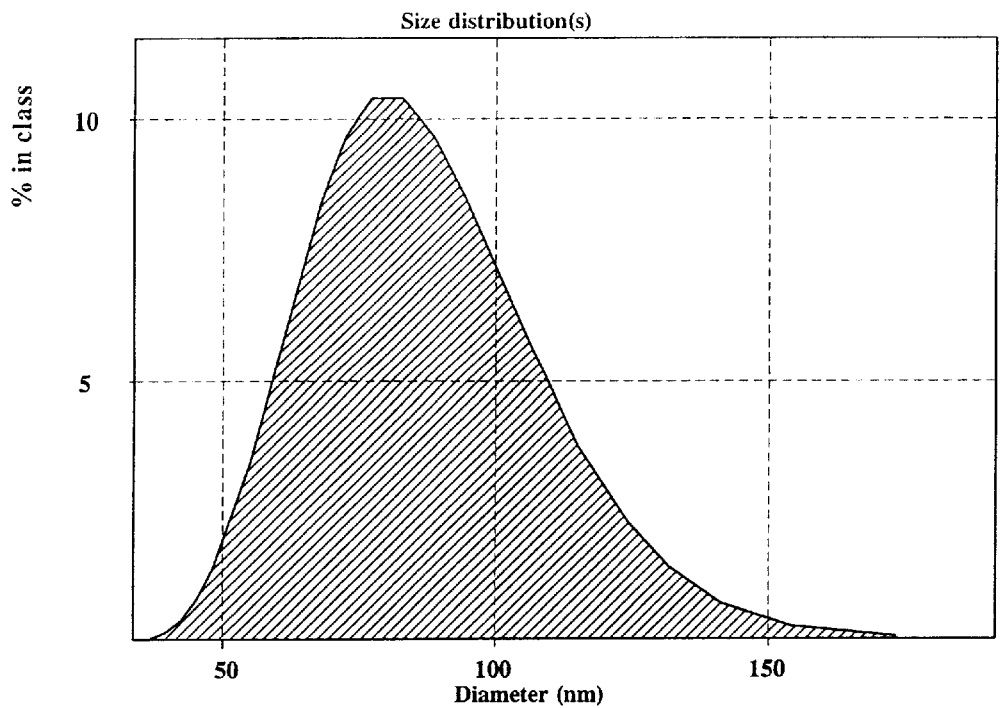
Figure 7:
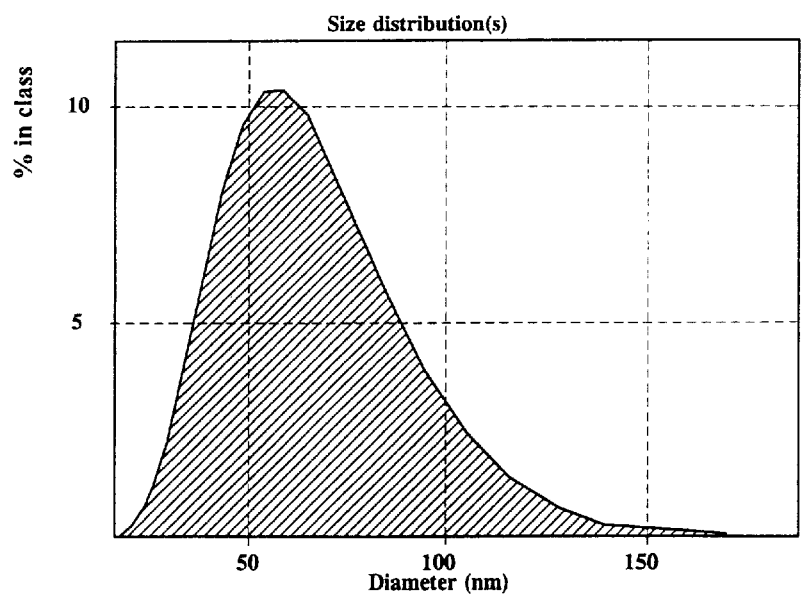

| Synthesis of phosphated polyester polyol | |
|---|---|
| 1,4 cyclohexanedicarboxylic acid: | 15.37 g |
| hexanedioic acid: | 22.00 g |
| 2,2-dimethyl-1,3-propane diol: | 47,73 g |
| 2-phosphono-1,2,4-butanetricarboxylic acid: | 15,00 g |
| Total: | 100,00 g |

The above monomer ingredients were charged to a reaction vessel equipped with a heating mantle, overhead stirrer, condenser, distillate receiver, a nitrogen inlet and sampling ports. The temperature was then set to 220° C. for 12 hours. Frequent sampling was carried out and the reaction was terminated at an acid value of 12 mg KOH/g.

EXAMPLE 2

Synthesis of Water-Dispersible Phosphated Polyurethane Resin and Synthesis of Aqueous Phosphated Polyurethane Dispersion

| | |
|---|---|
| polyester polyol of Example 1: | 100.00 g |
| toluene diisocyanate: | 30.00 g |
| 2,2-dimethylol propionic acid: | 4.50 g |
| N-methyl pyrrolidone: | 4.50 g |
| Total: | 139.00 g |

The above materials were charged in a glass reactor equipped with a heating mantle, thermometer and overhead stirrer. The contents were heated to 65° until all the toluene diisocyanate is completely reacted as measured by n-dibutylamine back titration. The temperature was then reduced to 40° C. and triethylamine was added to the water-dispersible, phosphated polyurethane resin to neutralise the pendent carboxylic acid groups, followed by the addition of water. Total solids of the resulting aqueous phosphated dispersion were adjusted to 35% by mass.

EXAMPLE 3(a)

| Primer coating preparation and application of primer coating by coil coating process | |
|---|---|
| phosphated polyurethane dispersion of Example 2: | 100 g @ 35% solids |
| hexamethoxymethyl melamine (curing agent): | 8.75 @ 100% solids |

The above curing agent was mixed with the dispersion of Example 2 to provide a primer coating composition. The pH can be adjusted to pH 8 if necessary. Water can also be added to the above to reduce the viscosity should it be necessary. The coating was applied to galvanised steel as a primer coat using draw down bar to give a dry film thickness of 8μ. The primer coating was cured at a temperature of 230° C. peak metal temperature for 40 s according to the known coil coating process. Depending on the curing time, curing temperatures may be as low as 170° and as high as 245°. Optimum curing times of 6 min @ 170° C. and 20 s @ 245° C. were recorded. Since most of the existing coil coating time requires a curing time of 40 s, the optimum peak metal temperature was 230° C.

EXAMPLE 3(b)

This Example was similar to Example 3(a), however, the curing agent used in Example 3(a) was replaced by partially methylated melamine (9,72 g @ 90% solids) and mixed with the phosphated polyurethane dispersion of Example 2 (100, 00 g @ 35% solids) to prepare a primer coating as described in Example 3(a). The primer coating was applied to galvanised steel to 8μ dry film thickness and cured in 25 s at 230° C. peak metal temperature because of the highly reactive methylol groups in the partially methylated melamine.

The Applicant has carried out extensive experiments and studies to characterise the dispersion of Example 2 using dynamic Zeta Sizer for particle size and particle-size distribution, gel permeation chromatography for molecular mass and molecular mass distribution, atomic force microscopy for the state of the dispersion, and infrared spectroscopy for functional group identification. The results obtained from dynamic Zeta Sizer and atomic force microscopy studies showed that monodispersed particles in the order of <100 nm were achieved in the dispersion of Example 2 due to the hydration of the acid groups on the phosphate monomer. The Applicant has also conducted extensive experiments and studies to characterise the coatings of Examples 3(a) and 3(b) using dynamic mechanical thermal analysis for curing, dynamic contact angle analyser for wetting, and X-ray photoelectron spectroscopy for adhesion and elemental composition.

These experiments and studies are set out in detail in the results and discussions below in Examples 4–13. In the following, "PBTCA" refers to the phosphate monomer (2-phosphonobutane-1,2,4-tricarboxylic acid) used to prepare the polyester polyol of Example 1; "DMPA" refers to the stabilising monomer dimethylol propionic acid used to prepare the resin and dispersion of Example 2; "Commercial polyurethane dispersion" refers to a commercially available aqueous non-phosphated dispersion. Examples of such commercially available dispersions tested for comparative purposes were NEOREZ R961 and NEOREZ R960, both available from Zeneca Resins, and SANCURE 815 and SANCURE 825 available from B F Goodrich; "precursor dispersion" refers to an aqueous non-phosphated polyurethane dispersion similar to the dispersion of Example 2 and prepared by the Applicant from a non-phosphated polyester polyol similar to the polyester polyol of Example 1 but without any PBTCA in the reaction mixture of Example 1; and "precursor polyol" refers to a non-phosphated polyester polyol similar to the polyester polyol of Example 1 but without any PBTCA in the reaction mixture of Example 1.

EXAMPLE 4

Effects of PBTCA on Particle Size and Particle-Size Distribution

Particle-size distribution of a precursor dispersion was broader at low hydrophilicity and decreased slightly as the DMPA concentration was increased. When PBTCA-based polyesters were used as a soft segment the particle-size distribution was less than 1.5, which was less than the value given in the literature for most polyurethane dispersions[1]. Studies performed by Chen and Chen [1] showed a minimum particle-size distribution of 1.3–1.4 when metal hydroxides were the neutralising agents. According to their findings the alkali metal cation was more easily hydrated than the ammonium salt in the aqueous phase. The particle-size distribution in this experiment approached unity as the amount of PBTCA incorporated into the soft segment increased, as shown in FIG. 1. For polyurethanes based on the unmodified polyester soft segment, a minimum amount of DMPA (±3% by mass) was required for stable dispersions, When DMPA was less than 3%, the ionic groups were too few to stabilitse the dispersed particles, and as a result the dispersions sedimented overnight. It is interesting to note that when PBTCA-modified polyesters were used, the level of DMPA could be reduced substantially whereas the resulting dispersions were stable for more than 3 months.

From the results obtained from particle-size analysis it can be concluded that the presence of the free tertiary carboxylic acid in the polyester segment improved the stability of the dispersion and reduced the particle-size distribution, even at a low concentration of DMPA. This may suggest that the free acids in the soft segments of the PBTCA-modified polyesters hydrated upon neutralisation. Ionic polyurethanes include both urethane polyelectrolytes and urethane ionomers[2]. The major difference between polyelectrolytes and Ionomers is that the former have very high ionic content, usually one ionic group per repeat unit, whereas the latter have low ionic content in the hard segment (e.g. acidic groups that can be crosslinked by metal salts) and nonionic soft segments.

The unusual characteristic of the soft segment used in this study was its high acid value as the amount of PBTCA was increased. It has been[3] the subject of most urethane chemists to use extremely low-acid-content polyester polyols as a soft segment to avoid any competitive side reaction of the —NCO groups with the —COOH group to form amides, as shown by:

—NCO+—RCOOH→RCONH+CO$_2$

This may lead to branching and crosslinking. However, the high steric effects of the tertiary carboxylic acid groups showed a very slow reaction toward isocyanates when compared with the —OH groups. At high acid value (10–20 mg KOH/gm) linear polyurethanes were synthesised without the occurrence of crosslinking.

A commercial polyurethane dispersion and the precursor dispersion were also used as a control during particle-size determination, and the results are presented in FIGS. 2–7. FIGS. 2–7 represent the particle size distribution of a commercial polyurethane dispersion (FIG. 2), the percursor dispersion (FIG. 3), and PBCTA-modified dispersions (PBTCA 15% FIG. 4; PBTCA 20% FIG. 5; PBTCA 10% FIG. 6; PBTCA 5% FIG. 7).

It is clear that both the commercial and the precursor dispersions have high particle-size distributions whereas the PBTCA modified dispersions show narrow dispersities.

EXAMPLE 5

Atomic Force Microscopy

The use of atomic force microscopy (AFM) offers the possibility of providing very high resolution images of non-conducting film surfaces with very little sample preparation and with inspection being done under ambient conditions. This method is of considerable value in examining the properties of latex films and in carrying out the non-destructive examination of surfaces after accelerated weathering, or in any other tests down to the nanometer size scale.

The system basically comprises a very fine point tip mounted on a spring cantilever, which is brought into close proximity with the surface. The tip is then moved across the surface to scan the desired area. As this is done, a laser beam is reflected from the tip and vertical movements, due to variations in distance, are tracked by a photodetector. In this way a three-dimensional map of a surface can be compiled in a computer and analysed.

Figure 8:
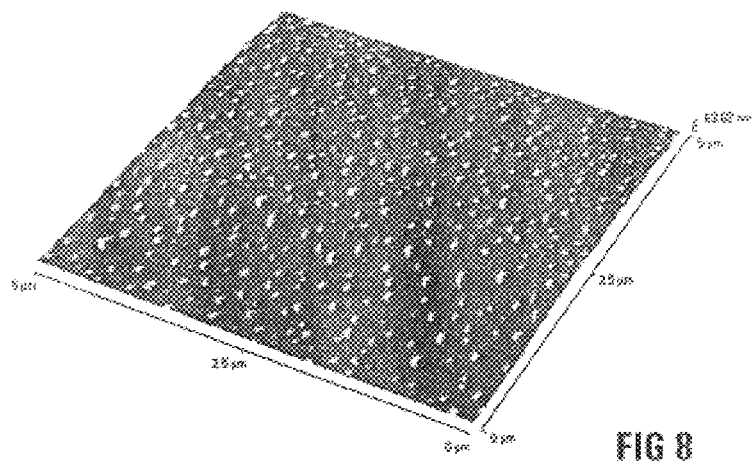
FIGS. 8–10 show atomic force microscopy images of various test surfaces.
Figure 9:
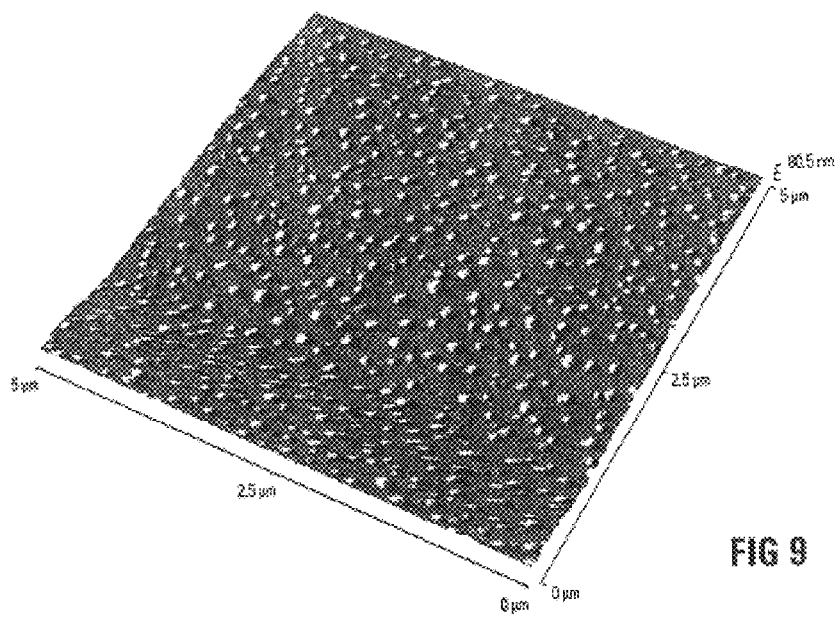
Figure 10:
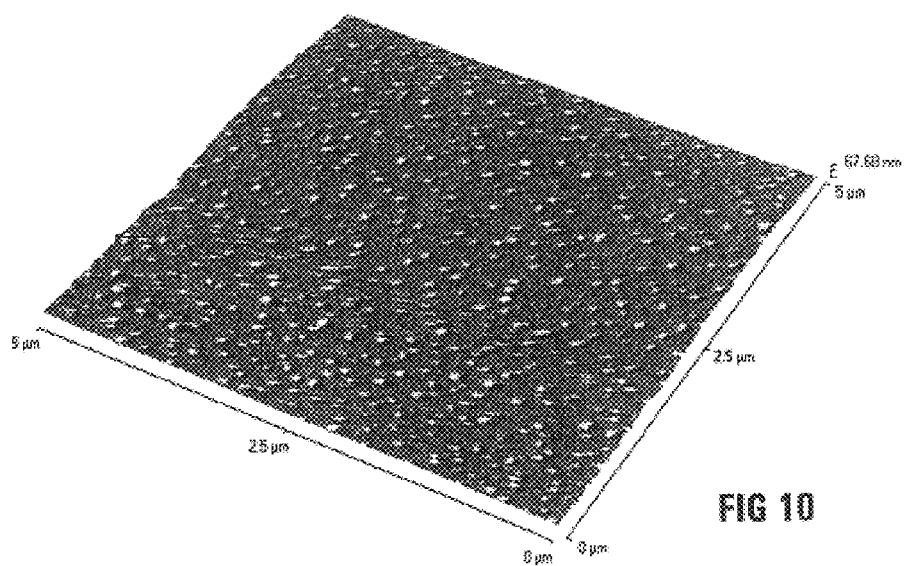

AFM images were compiled on an Explorer TMX 2000 Atomic Force Microscope using a silicon tip (high-resolution) at a force constant of 30–80 N/m in the noncontact mode. A droplet of the sample was dried on a polished silicon wafer at room temperature and the state of the dispersion was investigated. The images given in FIGS. 8–10 support the results from the nanosizer in terms of particle distribution. FIGS. 8–10 represent AFM images of PBTCA-modified polyurethane dispersions (10% PBTCA FIG. 8; 15% PBTCA FIG. 9; 20% PBTCA 20% FIG. 10).

EXAMPLE 6

Molecular Mass

The molecular masses of the polyester polyols and the polyurethanes were determined by GPC, using polystyrene standards. Samples were dissolved in tetrahydofuran (THF) to adjust concentrations and the flow rate was 1.25 ml/min. Throughout this experiment the polyol molecular mass was kept in the range 2 500–3 000 and the polydispersities were 1.7. The molecular mass of the polyurethanes exceeded 8 000 in each case.

EXAMPLE 7

Variation of Viscosity on Ionic Content

Ionic urethane dispersions are generally very low in viscosity, are milky white, and have a characteristic bluish cast.

The viscosity of the dispersion is of great importance for film formation and practical applications, and is influenced by the average particle size, particle-size distribution, inter-particle interaction and most of all, its swellability. Those particles which hydrate easily are excellent film formers. Larger particle sizes are preferred for quick drying and very small particles are superior when deep penetration into the microvoids of a substrate is required. With small particle-size, the number of dispersed particles increases and higher dispersion viscosity results[4].

Both the physical appearance and the viscosity of anionic polyurethane dispersions are highly dependent on the number of ionic groups present. In this experiment, it is observed that dispersions that had low ionic concentration (<3%) had a very low viscosity, and that the dispersions sedimented after 12 h of standing at room temperature.

The viscosity of the emulsions increases with increasing content of the acid moiety, and with increasing degree of neutralisation.

Viscosity Variation With Degree of Neutralisation (DN)

Figure 11:
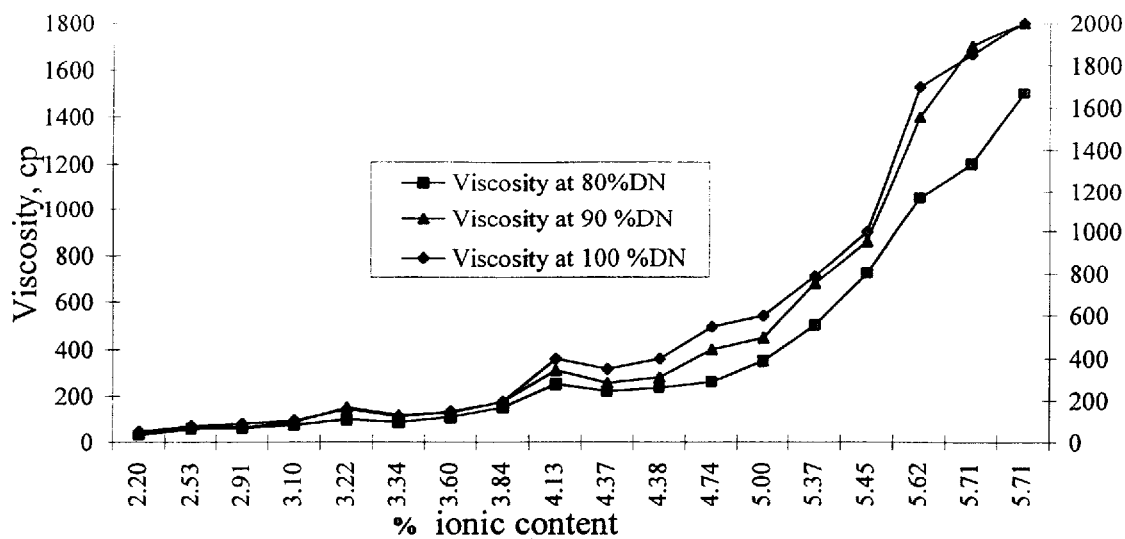
FIG. 11 shows a graphical respresentation of viscosity as a function of ionic concentration and degree of neutralisation of the phosphated polyurethane aqueous dispersion of the invention.

As the DN increased, the hydrophilicity of the polyurethane increased endowed by the increase in ionic content. In the range of low DN, particle size decreased rapidly with increasing DN. At a high level of DN, the decrease in particle size was offset by the increased absorption of water, and an equilibrium particle diameter was obtained to give an asymptotic decrease in particle size[5]. FIG. 11 shows dispersion viscosity as a function of ionic concentration contributed by DMPA and PBTCA at 80% DN, 90%DN and 100%DN.

In polyurethane dispersions the ionic centres are located on the surface of the dispersed particles, while the hydrophobic chain segments form the interior of the particle[6,7]. Particle stabilisation can be explained by a diffuse double-layer model[8]. The dissociation of the carboxylate salt and the phosphoric acid groups form a double layer at the interface. The carboxylate and phosphoric anions which are chemically bonded to the polyurethane backbone remain fixed to the particle surface whereas the counterions migrate into the aqueous phase. Their distance depends on the attractive forces of anions. This forms a layer of decreasing electrical charge and imparts an electrokinetic or zeta potential to the surface of the particle. The repulsive force of the zeta potential between particles is responsible for the overall stabilisation of the dispersion.

EXAMPLE 8

Effects of PBTCA Groups on Water Absorption

The effects of the presence of PBTCA groups on water absorption by the uncrosslinked polyurethane films were also studied. It can be postulated that the hydrophilic and ionic nature of PBTCA could increase the polarity of polyester resins modified by this monomer, compared with the unmodified polyesters, resulting in high water absorption with the same percentage of DMPA. However it was shown that this was not so. The presence of PBTCA in the urethane chain did not seem to have any effect on water absorption. The results on water absorption test as a function of ionic content showed that, for two dispersions that have an approximately equal ionic content but differ in terms of their PBTCA content, water absorption was inversely proportional to the amount of PBTCA present.

Figure 12:
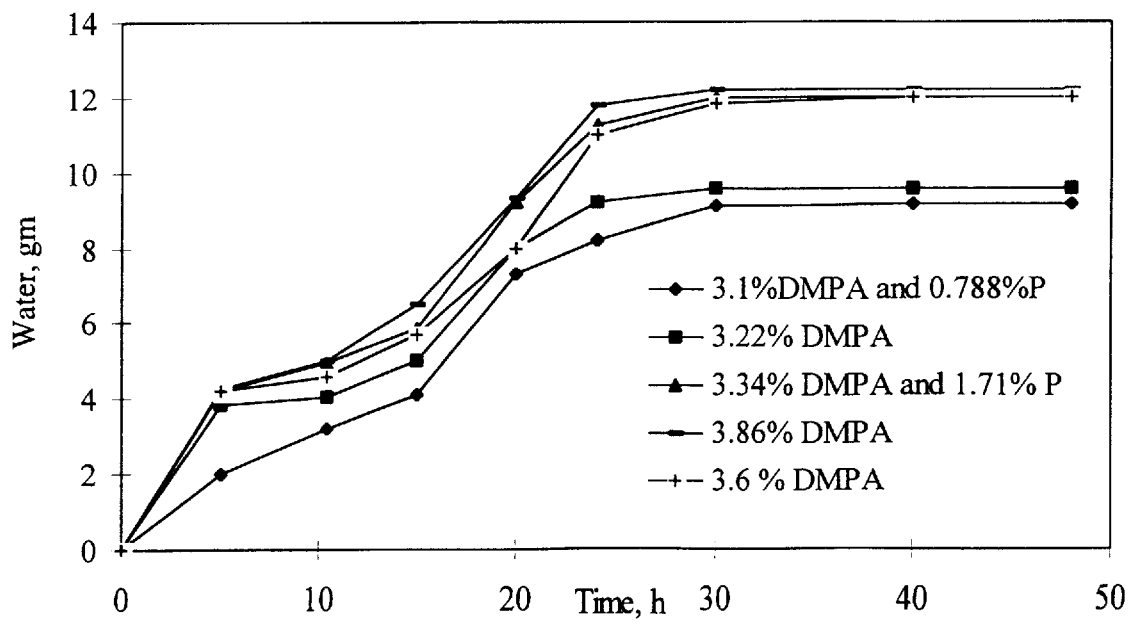
FIG. 12 shows a graphical representation of water absorption of uncrosslinked polyurethane dispersions.

In FIG. 12, the water-absorption values of uncrosslinked polyurethane disipersions are plotted against the percentage content of ionic groups and phosphorus. There were no simple relations that could be made between polar groups and the amount of water absorbed. The reason for this was that absorption was governed by the degree of ordering of the polymer molecules, the accessibility of polar groups to water molecules and the strength of intermolecular forces between water and polar groups[9].

EXAMPLE 9

Infrared Studies

Figure 13:
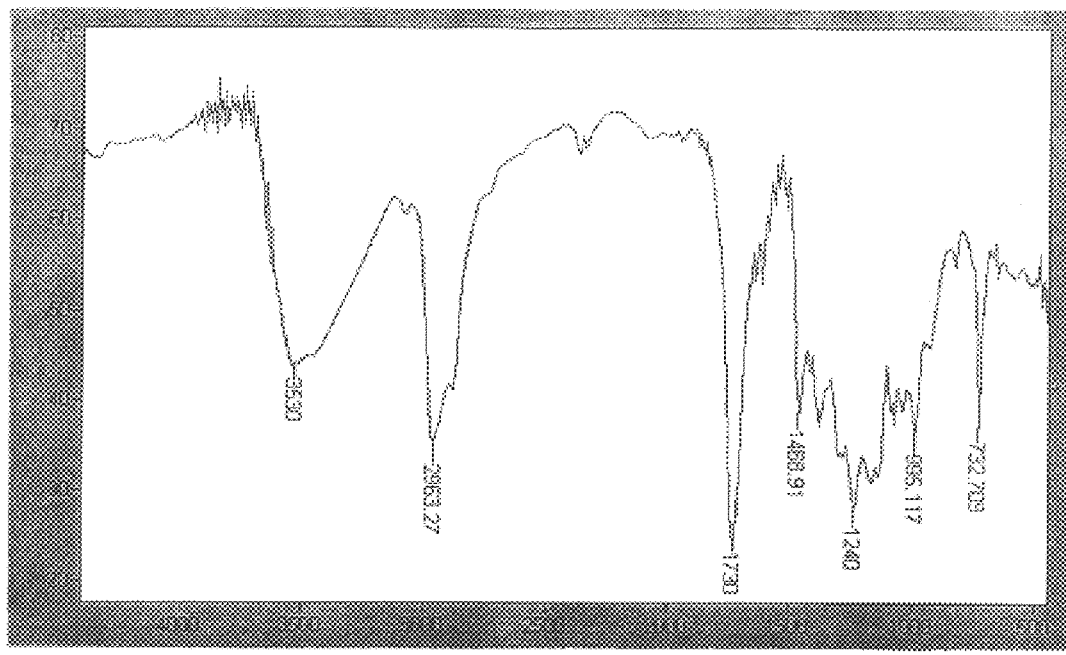
FIGS. 13–15 show infrared spectra in studies of the unphosphated polyol, the phosphated polyol of the invention, and the phosphated polyurethane resin of the invention.
Figure 14:
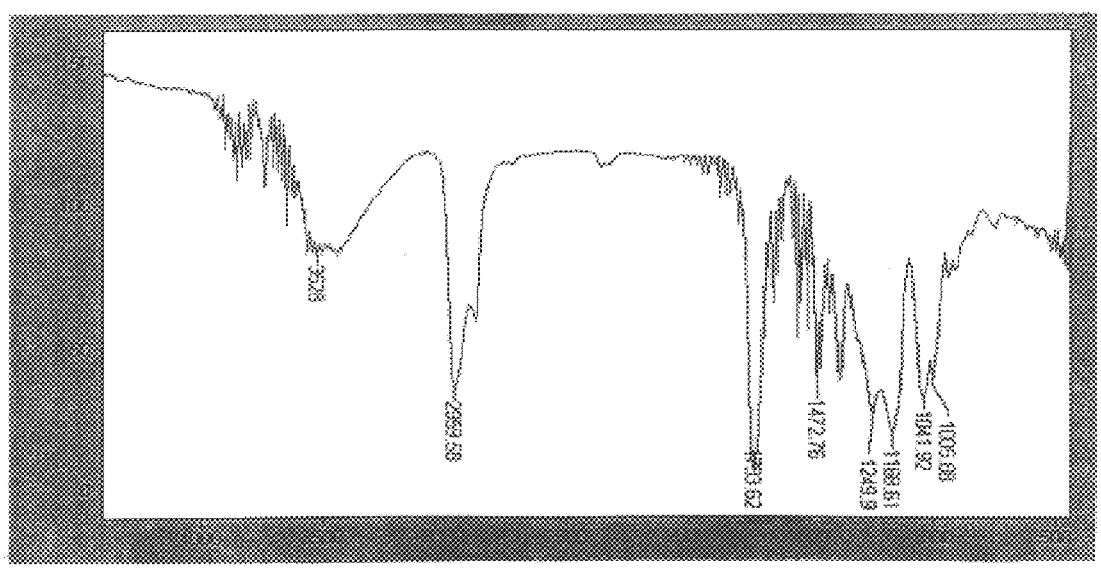

FIGS. 13 and 14 show the infrared spectra of the precursor polyester polyol and the PBTCA modified polyester polyol respectively.

As shown in FIG. 13, the unbonded (free) hydroxyl groups of the polyol absorbed in the region of 3650–3584 $cm^{-1}$. However, sharp hydroxyl bands are observed only in vapour phase or in very dilute solution, otherwise intermolecular hydrogen bonding increases with concentration and additional bands start to appear at lower frequencies (3550–3200 $cm^{-1}$) at the expense of the free hydroxyl band[10]. Bands around 3530 $cm^{-1}$ are of the —OH group. The absorption in the range of 2800 to 3000 $cm^{-1}$ is primarily due to the C—H stretching and the bands in the region of 1400–1500 $cm^{-1}$ are due to the C—H vibrations for both polyols.

FIG. 14 shows two bands at 1005 and 1041 $cm^{-1}$ which are the P=O stretching vibration and the absorption at 1168 $cm^{-1}$ indicates the aliphatic nature of the P=O stretching [11], since the monomer used is aliphatic. A medium-strength absorption is observed in the range 1610–1700 $cm^{-1}$ for the P=O(OH) groups[12]. The hydrogen bonded phosphoryl (P=O) group has a characteristic absorption in the region of 1250–1260 $cm^{-1}$ [13].

Figure 15:
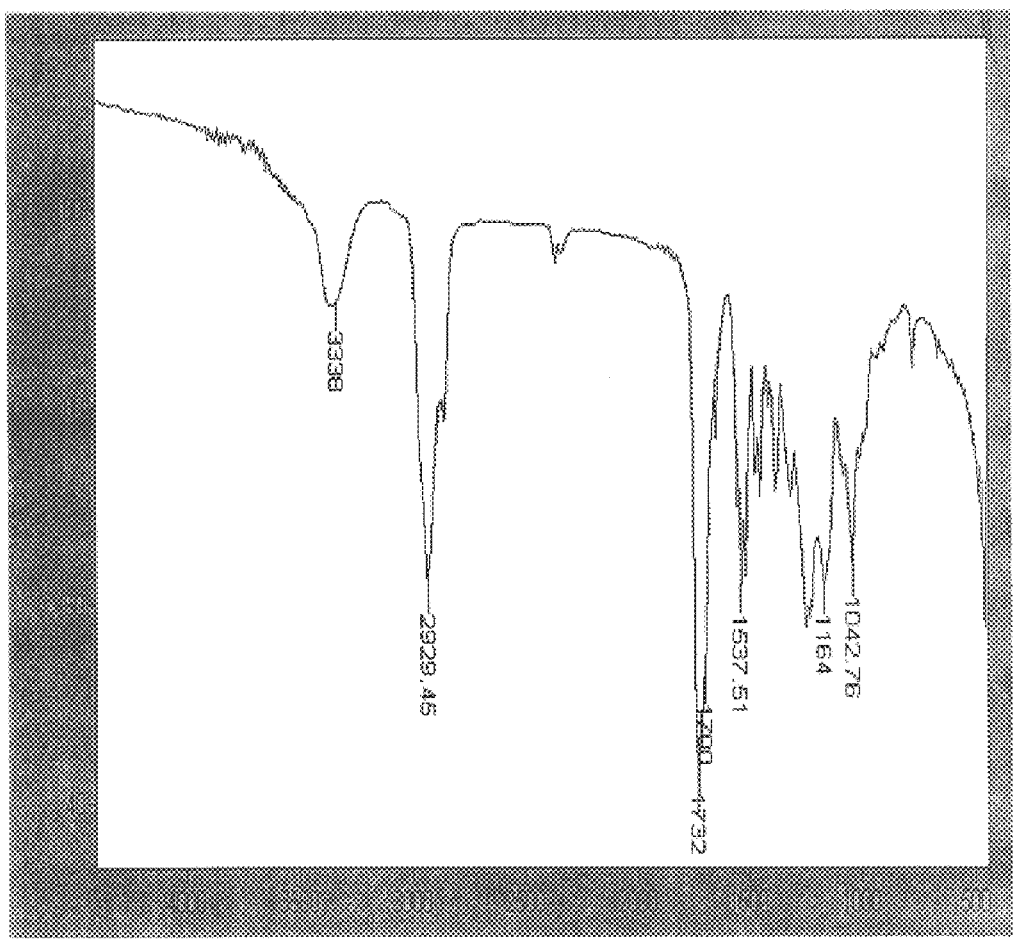

The spectra of the polyurethane resin of the invention using PBTCA-modified polyester polyol as a soft segment, is shown In FIG. 15. The band at 3338 $cm^{-1}$ is that of the hydrogen-bonded NH groups of the urethane. Since free (unbonded) NH groups absorb in the region of 3420 $cm^{-1}$, the absence of this band indicates complete hydrogen bonding. This can also be seen from the bonded carbonyl (C=O) group of the urethane at 1700 $cm^{-1}$. The characteristic band of the urea C=O at 1690 $cm^{-1}$ is absent as the polymers are pure polyurethanes which do not contain urea linkages.

The presence of hydrogen bonding between the functional groups indicates the degree of phase mixing between the incompatible soft and hard segments. In spite of the covalent bond between the two phases, segregation occurs primarily through physical bonds. Superior mechanical properties in two phase polymers will be favoured if the phase boundary is broader rather than sharp[14]. This broader interfacial boundary between the two segments was to be expected when the polarity of the soft segment increased. The polarity of the soft segment raised the solubility and promoted intersegmental hydrogen bonding which improved segmental compatibility. In a pure urethane hard segment hydrogen bonding, which arose from the hydrogen atoms of the —NH— groups, served as proton donors and the polyester C=O groups acted as proton acceptors[15,16]. Thus, when the urethane hard domain and the polyester soft segment were mixed at the molecular level, the oxygen atom in the polyester backbone also acted as a proton acceptor in participating hydrogen bonds with the NH groups in the urethane linkages. For phosphorus-modified polyurethanes, the soft segment had even greater polarity. The polarity could be close to that of the hard segment which contained polar urethane groups. This proximity in polarity between the two segments resulted in good compatibility between the soft and the hard segments through hydrogen bonding.

EXAMPLE 10
Cross-Cut Adhesion (Tape Adhesion)

The ability of an organic coating to adhere to the substrate is essential for almost any use of a coated material. Different theories of adhesion mechanisms have been developed over the past 40 years. The adsorption, diffusion, electrostatic, chemical and mechanical bond theories are the basic mechanisms that apply to the adherence of organic coating to a solid surface.

In an adhesion test, a lattice pattern with 12 cuts in each direction was made to the film, care being taken to ensure that each cut was made deep enough to reach the solid substrate. Each resulting lattice (square) was 1.5 mm×1.5 mm. A pressure-sensitive tape was applied over the lattice and then removed at an angle of 180°. This adhesion test basically follows ASTM D-3359-87. This test is most useful in providing a relative rating for a series of coated panels exhibiting significant differences. In this method any flaking, detachments at intersections and removal of the square cuts with the tape can be investigated.

Results and Discussion

The measurement of adhesion of a coating is particularly difficult because of the lack of suitable 'handles' for applying the forces necessary to remove a coating layer from its substrate[37]. Because of this, adhesion tests in the coating industry are usually done along with tests of several other properties at the same time, making the adhesion component difficult to isolate. The impact and flexibility tests that have been done previously are also a measure of adhesion. In an impact test, the strength of the adhesive bonds for similarly prepared but different coatings can be comparatively evaluated. The discussion given here concerns the observations made during impact, flexibility and tape-adhesion tests.

For coatings prepared from the unmodified precursor polyol, failure of adhesion was observed when impacted at ambient conditions. During this test the film deformed without cracking; but a thin layer of the coating peeled off from the substrate. This loss of adhesion was very evident, especially on reverse impact.

With polyurethane modified with PBTCA, there was a great improvement in the results of adhesion tests done under similar conditions to the unmodified precursor polyol. On reverse impact of the crosscut lattices, using 1.8 kg mass from a height of 1 m, there was no flaking or delamination of the small squares (1.5 mm×1.5 mm). By comparison, the unmodified precursor coating had flaked more than 25%. On O-T bending of the modified coating, although it cracked, films adhered well to the base metal. A possible explanation for the markedly improved adhesion of the modified urethane was the interaction of the phosphoric acid groups of the polymer with the zinc layer of the strip. This interaction can be expected in a way similar to that of commercial pretreatment line. Immersion of the metal in a solution of zinc phosphate in the presence of phosphoric acid is often used to pretreat steel coils[37(b)].

$$Zn+2H^+ \rightarrow Zn^{2+}+H_2 \text{ (pickling)}$$

$$3Zn^{2+}+2H_3PO_4+4H_2O \rightarrow Zn_3(PO_4)_2 . 4H_2O+4H^+$$

(phospahte coating). Hopeite, a mineralogical term is used to denote the process of zinc phosphate conversion coating. This process does not cover the entire metal surface and, as a result, about 5% of the metal layer is unphosphated[38].

The functional groups that can possibly interact on the metal to produce a metal phosphate layer are P—OH, P—O$^-$ and P=O. The dissociated P—O$^-$ in the resin system can form the ionic bond of P—O$^-$—Zn$^{2+}$ with the metal[39]. The strong adhesion of this coating suggests the acid-base interaction by the zinc layer of the metal and the polymer-chain phosphoric acid groups to form P—O$^-$/Zn$^{2+}$, rather than induced dipole interaction of the P=O/M complex type. The structure of the polymer derived from PBTCA shows reactive functional groups. The presence of these functional groups in this experiment were also verified by infrared spectroscopy.

The bonding strength of P—O$^-$/metal(M$^{z+}$) is ionic and stronger than the P=O/metal bond which is induced dipole. When the reactive groups of the phosphated polymer are of the type P—OH, it is essential that these groups dissociate to P—O$^-$. This means that the addition of water to the system promotes dissociation and increases the deposition time. Conversely, the formation of metal phosphate in its crystalline form requires the addition of water.

A coating component in which phosphurus-containing active groups, for example, phosphonate anion groups are chemically bonded to a resin system and which improves the adhesion as well as phosphating the metal has never before been reported as far as the Applicant is aware. The simultaneous phosphating of metals using a phosphatising agent as a separate additive to a paint formulation, is a recent development[40–42]. The phosphate coating consists of a non-conductive layer of crystals that insulates the metal and prevents corrosion.

The effects of the neutralising amine on the adhesive property of the modified urethane were also studied. It has been found that coatings neutralised with triethanolamine gave inferior adhesion, compared with that of triethylamine. According to Yu et al/[43], the neutralising amine forms a weak complex with the acidic phosphatising agent. The generation of reactive sites depends on the thermal dissociation of the weak complex. Thus it is not surprising that the P=O or P—OH groups of the phosphated urethane, neutralised by triethanolamine, are trapped and are not dissociated. This could minimise the number of reactive phosphate groups with the metal and reduce the number of ionic bonds.

EXAMPLE 11
Surface Analysis
X-ray Photoelectron Spectroscopy (XPS)

XPS is one of the surface chemical composition analytical techniques which covers a wide range of applications. This method involves the measurement of binding energies of emitted photoelectrons by ionisation of the atoms with X-rays inside a high vacuum (<10$^{-5}$ pa). An X-ray of energy hv can eject any electron that has a binding energy(BE) less than its energy, with an intensity that is related to the photoelectric cross-section. Since every element has a unique set of electron-binding energies, qualitative elemental identification is possible using XPS from the measured kinetic energy, hv-E.

The sensitivity of XPS increases from Z=3 to Z=12 (carbon) and then decreases. The successive observation of the 1s, 2p, 3d, and 4f electrons at a higher Z number is the reason for this decrease[44]. Electrons ejected at any energy level must escape from the solid for detection without experiencing inelastic collisions. The kinetic energy of these electrons depends largely on their binding energies which allows the element to be identified from the peak intensities which are proportional to the number of atoms in the samples photoelectron emission. The source of X-rays is mostly Mg K (1253.6 ev) or Al K (1486.6 ev). From this, the emitted electrons are collected by an electrostatic energy analyser and detected as a function of their kinetic energy ($E_K$). The binding energy ($E_B$) of the electrons is obtained from the Einstein equation, $$E = hv - E_K$$

where, hv=X-ray photon energy $E_K$=kinetic energy of ionised core

With this technique all elements except hydrogen and helium can be detected. Compounds can also be detected, as the binding energy of an element differs from compound to compound.

EXAMPLE 12

Depth Profiling

In addition to information about the original surface, information is required about the distribution of the elements or compounds to depths considerably greater than the inelastic mean free path. This is important when the preferential adsorptions of certain functional groups to the substrate interface are considered. It is known that the polar groups of the binder macromolecules can align themselves to the polar and hydrophilic layers of the metal[44]. By using a phosphate ester as a separate additive in an in-situ metal phosphating system, Chuang and Lin[45] observed that the phosphate groups were preferentially adsorbed in the metal-coating interface and that the distribution throughout the film was not uniform. In this regard depth profiling can be done by surface-sensitive probe beams in combination with ion etching, sputter etching, ion milling, and atomic layer-by-layer microsectioning.

Sputtering, the process of removing a layer of a material by bombarding the surface with an energetic ion beam (0.5–10 KeV argon ions), provides a means for atomically microsectioning the solid, and the sputtering time can be related to depth[46].

Experimental

Coatings were prepared in very thin layers (2–4µ) and cured as described above. Samples 1 cm×1 cm were cut and loaded into a Quantum 2000 Intro chamber which was then evacuated. Wide spectra (over a wide range of energies) were recorded of the samples by using Quantum 2000 Scanning ESCA Microprobe (PHI). The source of X-rays was monochromated Al k (1486.6 eV),1 SkV. Quantitative data were calculated from the peak areas for each element. The samples were then Ar$^+$ ion sputtered (2 kV Ar$^+$ ions, sputtering rate, 14 nm/min) to remove approximately 7 nm of the top surface. After the sputtering step, wide spectra were recorded on the samples and quantitative data was calculated from the peak areas for each element.

Results and Discussion

The percentages of each element before and after sputtering are given in Table 1.1. In Samples 2 and 3, the phosphorus content increased with depth whereas Sample 1 shows a possible reduction with depth.

After the sputtering step, silicon was completely removed from Sample 1, indicating that the levelling agent which contained silicon was oriented on the top surface after curing. In Sample 2, silicon decreased sharply, from 7.2% to 2.2%, whereas in Sample 3 there was little appreciable difference in silicon with depth. The most striking difference seen was that for oxygen. After the sputtering step, oxygen decreased drastically in Samples 1 and 2, whereas it remained almost constant for Sample 3. The difference in oxygen contents for Samples 1 and 2, after sputtering, resembled that of the percentage oxygen in the silicon which had been removed.

From the chemical structure point of view, most silicone additives contain the basic Si—O—Si bond. Since higher amounts of silicon and oxygen were detected before sputtering than after sputtering, the increase in oxygen on the outermost surface was mainly from the additive. As the Si—O—Si bond was removed from the surface, so the oxygen decreased quantitatively.

This fact is also confirmed by results of Sample 3. For Sample 3, silicon decreased from 5.6% to 4.9% and oxygen from 28.2% to 28%. Since the silicon concentration was higher even after sputtering, the oxygen also remained more or less constant. The reason for the presence of calcium in Sample 3 is, however, not clear. From XPS analysis it can be concluded that:

1. The distribution of phosphorus increased with depth and proved to be an integral part of the polymer;
2. The flow additive migrated to the outermost surface of the film and lowered the surface tension, whereas the polar component of the polymer migrated to the polar metal interface[47].
3. A quantitative prediction can be made by comparing the chemical nature of the additive and cross-referencing this with the element depthdistribution before and after sputtering.

Reorientation of a polymer surface due to the mobile nature of polymers minimises the interfacial free energy with the surrounding medium. The presence of the low-surface-energy silicon on the layer of the primer coat may affect the subsequent adhesion of the top coat.

There are two problems associated with polymer sputtering:

1. Sputtering should be done only for the second or third atomic layer of the polymer. Although it is possible to sputter more deeply than this, high-energy bombarding of the sample by X-rays can degrade the polymer, causing incorrect results to be observed.
2. During the irradiation process the lighter electrons may be preferentially extracted rather than the heavier ones. This is, in fact, not entirely true, because bond strength plays a role.

TABLE 1.1(a)

| | Sample 1 | |
|---|---|---|
| Element | % on the surface | % after sputtering |
| Si | 1.2 | 0.00 |
| P | 1.5 | 1.2 |
| C | 69.2 | 84.2 |

TABLE 1.1(a)-continued

| | Sample 1 | |
|---|---|---|
| Element | % on the surface | % after sputtering |
| N | 6.6 | 8.2 |
| O | 21.5 | 6.4 |

TABLE 1.1(b)

| | Sample 2 | |
|---|---|---|
| Element | % on the surface | % after sputtering |
| Si | 7.2 | 2.2 |
| P | 0.2 | 0.8 |
| C | 63.1 | 84.2 |
| N | 4.6 | 8.4 |
| O | 24.9 | 4.5 |

TABLE 1.1(c)

| | Sample 3 | |
|---|---|---|
| Element | % on the surface | % after sputtering |
| Si | 5.6 | 4.9 |
| P | 2.2 | 4.4 |
| C | 62.1 | 55.3 |
| N | 1.9 | 6.8 |
| O | 28.2 | 28.0 |
| Ca | — | 0.6 |

Table 1.1 (a) to (c) Atomic compositions of PBTCA-modified urethane coatings with depth

EXAMPLE 13

Adhesion of PBTCA-Modified Urethane Dispersions From Contant-Angle Study

Figure 16:
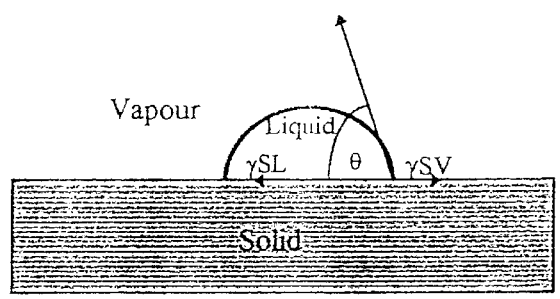
FIG. 16 shows schematically contact angle θ for a sessile drop on a solid surface.

The measurement of advancing and receding contact angles between a solid and a liquid gives information about the wettability of the solid. For a sessile drop on a solid surface the contact angle θ, which is the tangent to the liquid surface at the air/liquid/solid line of contact and a line through the base of the liquid drop where it contacts the solid, is shown in FIG. 16.

The contact angles which the three-phase contact line makes with the surface, when brought to rest after being slowly advanced or withdrawn across the surface, define the advancing and receding contact angle respectively[18]. The difference between the advancing and receding contact angle is the contact angle hysteresis.

The concept of critical surface tension ($\gamma_c$) discovered by Zisman[19] was an important contribution to surface chemistry. If a surface is wetted by a series of liquids, the cosine of the contact angle θ appears to be a linear function of the surface tension of the liquids. The line drawn through the surface tension value plotted against cos θ extrapolated to cos=1 gives the critical surface tension of the surface used [20]. The interpretation of $\gamma_c$ is that liquids having a surface tension greater than $\gamma_c$ will not spread on a solid and liquids with surface tension less than $\gamma_c$ will spontaneously spread on the surface if applied as a drop[21].

One limitation of the critical surface tension concept is that values for different series of test liquids can be extrapolated to different $\gamma_c$ on the same surface[22]. Since the original definition of the $\gamma_c$ was based on the non-polar homologous series of n-alkanes, $\gamma_c$ is very difficult to measure when polar and hydrogen-bonding liquids are used. Generally, hydrogen bonding liquids give lower $\gamma_c$ values than hydrocarbons do(23].

Figure 17:
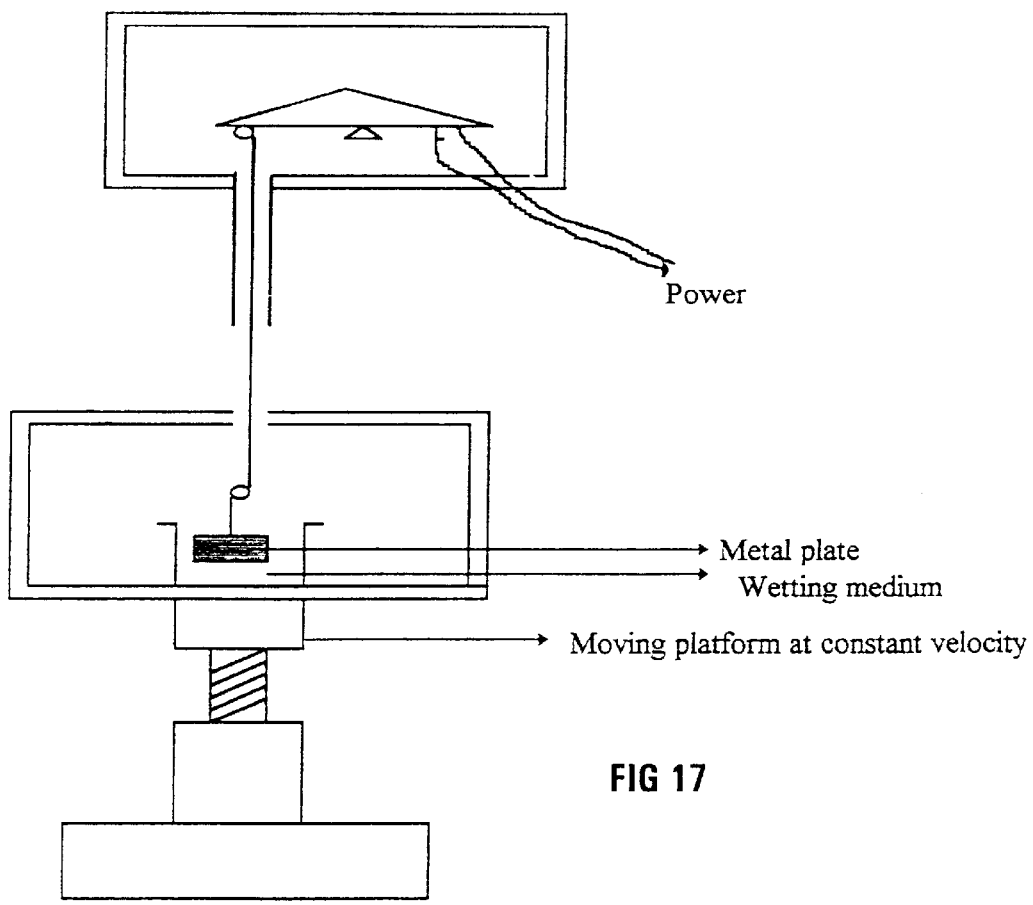
FIG. 17 shows schematically The Wilhelmy plate technique for measuring wettability.

The most convenient way to determine the wettability of a surface, for example, a metal surface, is to use the Wilhelmy plate method. The diagram in FIG. 17 illustrates the method[18].

If a uniform plate of metal or any other solid is suspended below the pan of an electromicrobalance, the force $F_o$ acting on the metal, when it just touches the surface of the liquid, is given as;

$$F_o = P\gamma_{LV} \cos \theta_a \quad \text{(equation 1)}$$

P=Perimeter of the metal
$\theta_a$=advancing contact angle

However, on further immersion of the plate to a depth d, the force F is modified by a buoyancy factor:

$$F_0 = P\gamma_{LV} \cos \theta_a - \rho g A d \quad \text{(equation 2)}$$

Figure 18:
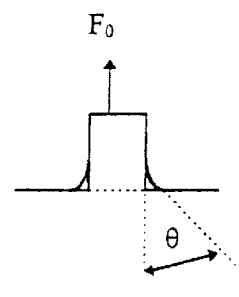
FIGS. 18 and 19 show schematically the force acting on a suspended metal plate during contact angle measurements when the plate just touches the liquid (FIG. 18) and after immersion to a depth d (FIG. 20)
Figure 19:
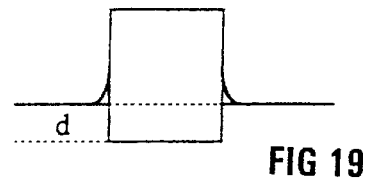

A=Crossectional area of the metal
ρ=Density of the solution
g=Acceleration due to gravity A plot of F against d, extrapolated to d=0, enables $\theta_a$ to be computed. The receding contact angle may be calculated from the measurement of the force on the metal as it is slowly raised through the solution. FIG. 18 shows the plate when it just touches the liquid and FIG. 19 shows the plate after immersion to a depth d.

Experimental

A CAHN Dynamic Contact Angle Analyser model DCA 322 with a velocity of 100 (0.1 mm/sec) at 25° C. was used to study wettability.

The bare metal was simply cut to a 1 cm by 1 cm size. The metal surfaces were coated by applying the PBTCA-modified thermoset urethane dispersion and the crosslinker mixture to the metal. After the one side was cured, the second side of the metal was also painted and cured similarly. Two types of coating were used: primer coating with no additive and primer coating with silicone-based flow additive. 1 cm×1 cm samples were then cut from both types for contact-angle measurements. Another set of samples was prepared by coating the two different primer samples with a conventional solvent-based silicone polyester top-coat to both sides.

Velocity Consideration During Contact-Angle Measurements

Dynamic contact-angle determinations were made under dynamic conditions, that is, at constant velocity of the moving platform during the dipping and retraction motions and were therefore volocity-dependent. Velocity dependence of the study of contact-angles has been the source of controversy. The inconsistency of reports in the literature is reflected in papers by different workers. Johnson and Dettre [24] reported velocity to be independent of the contact angle for homogeneous surfaces and to change slightly for heterogeneous surfaces. Kasemura et al. [25] observed that both advancing and receding contact angles increase with increasing platform velocity for polyvinyl alkylates. Du Toit [26] observed an increase in advancing contact angle with velocity, while receding contact angle seemed to be independent of velocity. A number of workers have claimed that at low velocities the contact angle is independent of velocity, whereas the velocity should be taken into account above 0.1 mm/sec[27–28]. In this experiment, the dynamic contact angle of water on a pigmented silicone polyester top coat was measured as a function of velocity. The results are given in the Table below.

TABLE

Dynamic contact angles of water on a cured silicone polyester top coat

| Velocity (mm/sec) | $\theta_a$ | $\theta_r$ |
|---|---|---|
| 0.05 | 77 | 48 |
| 0.1 | 84 | 47 |
| 0.15 | 90 | 47.5 |

Higher velocities resulted in an increase in the advancing contact angle whereas the receding contact angle was almost constant.

Solid-State Adhesion Prediction

The visual comparison of contact-angle hysteresis spectra for different surfaces on probe liquids was used by du Toit to predict the adhesion of treated and untreated polypropylene[26]. His prediction was based on the matching of the surface energies of the two adhering surfaces. From thermodynamic compatibility considerations, those surfaces, having similar hysteretic spectra, correlated with better adhesion since solids with similar graphs have similar surfaces.

| Liquid | Surface tension (N/m) |
|---|---|
| Water | 72.8 |
| N-methyl pyrrolidine | 40.7 |
| Dimethyl formamide | 37.3 |
| Propylene glycol monomethyl ether acetate | 28.2 |
| o-xylene | 30.1 |
| Hexane | 18.7 |

Surface tensions of probe liquids (N/m)

Results and Discussion

The results of the contact angle study is shown in FIGS. 20–23. Each graph represents one spectrum for each liquid. The bottom of each spectrum is cos $\theta_a$ and the top of each spectrum is cos $\theta_r$. In this contact-angle study, reproducibility of the primer coats with and without additive was restricted for two immersions. Beyond that, data were not reproducible due to swelling effects which gave rise to errors about the sample. Partially cured primers tend to swell on repeated immersion into strong solvents (as in PMA and DMF). If swelling occurs, hysteresis is large.

In FIGS. 20–23, the Y-axis is the cosine of the contact angle. The X-axis is an ordered list of probe liquid surface tensions. The length of each spectrum is the measure of the contact-angle hysteresis. FIGS. 20–23 represent respectively the hysteresis spectra of bare metal; primer coat; primer coat with additive; silicone polyester top coat.

Figure 20:
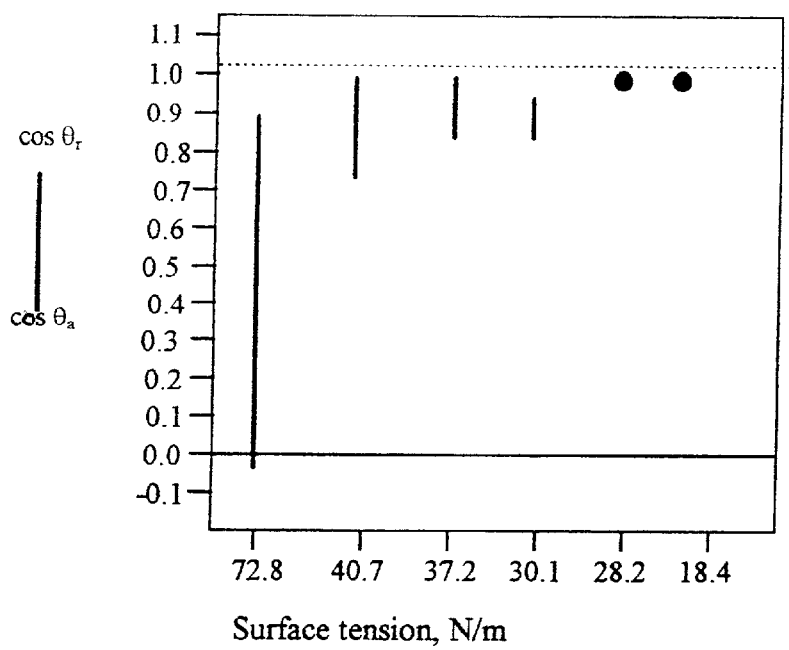
FIGS. 20–23 show schematically contact angle hysteresis spectra from different surfaces on probe liquids.
Figure 21:
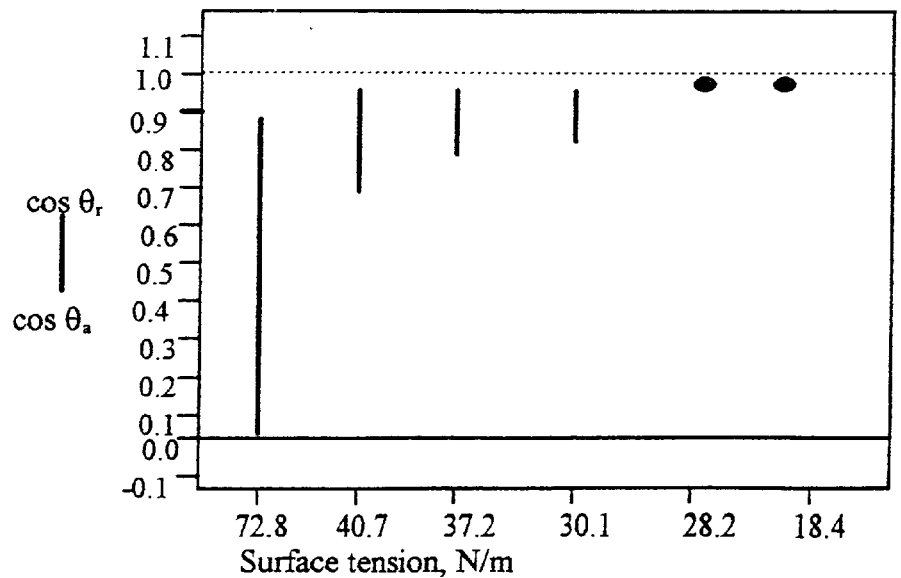

There is close similarity between the two spectra in FIGS. 20 and 21, which confirmed that the steel substrate and the primer film were compatible. As observed in the tape and bending adhesion tests described before, the contact-angle results proved that good adhesion is favoured.

Figure 22:
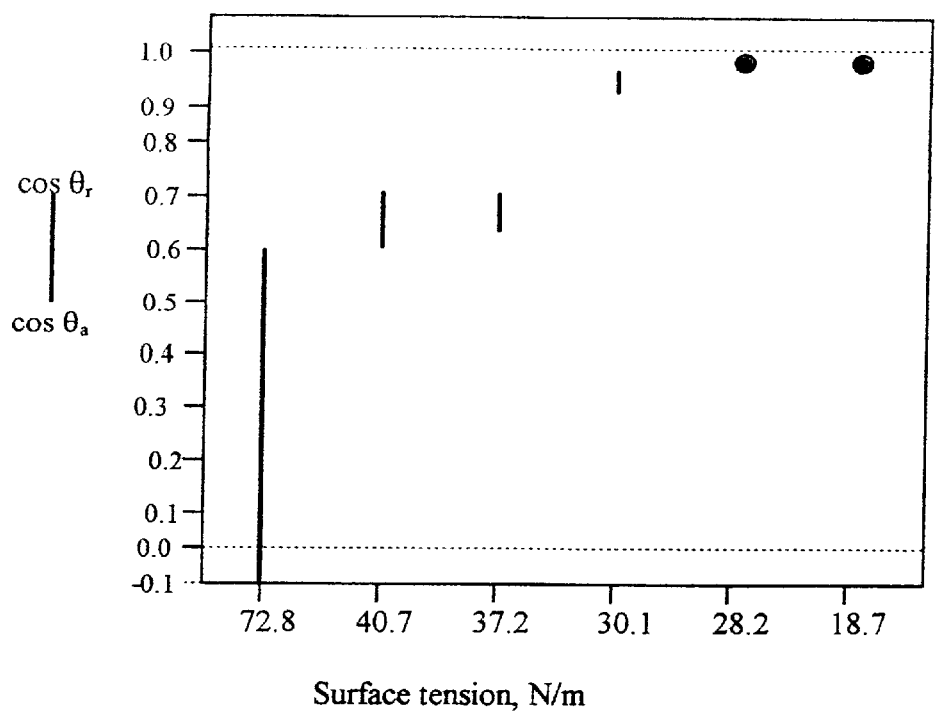

The-effect of additives an surface energies of a coating is shown in FIG. 22. It is well known that most paints, if not all, usually contain additives for many reasons; plasticizers, surfactant, flow promoters, and antifoams are usually incorporated. The latter two include mainly silicon-containing compounds. Most of these additives are not completely volatile and, as a result, residual molecules are expected to be present on the surface after curing. These classes of additives can easily change the surface properties of a coating. The high speed necessary to curermoil coatings thermally requires a paint system that flows and levels before the viscosity increases due to evaporation of solvents and subsequent crosslinking. In this study a small amount of a silicon-based flow additive was used to promote levelling of the wet film.

As discussed earlier, silicon was detected by XPS. It was also mentioned that the depth profile of the silicon decreased as the samples were sputtered. This was due to the migration of the silicon chain to the outermost surface of the film.

On comparing FIGS. 21 and 22, it is seen that the surface (c) is modified. When polar liquids (water, NMP and DMF) are used as a wetting medium, both $\theta_e$ and $\theta_r$ are dereased, indicating poor wettabin. The reduction of the surface energy of the coating layer, due to the low-surface-energy of silicon, is attributed to the poor wettability by moderately high-surface-tension polar liquids. This is not surprising since contact-angle measurements are highly sensitive to the outermost chemical characteristics of a solid surfacese [17]. Hydrophobic additives were made water-dispersible by the addition of surfactant. These surfactant may be volatile in a high-temperature curing operation such as coil coating. Once these surfactant are removed, the additive is hydrophobic and less wettable by polar liquids.

Orientation, a time-dependent process of small-molecule migration from, and onto, the surface of polymers and polymer molecular reorientation have been known to affect contact-angles[29]. Polymer molecules near the interface are mobile and reorientation of the surface is possible when the surface is moved into a different medium. This reorientation minimises the interfacial free energy with the surrounding phase[30], which explains the changes in wetting properties when additives are used.

Figure 23:
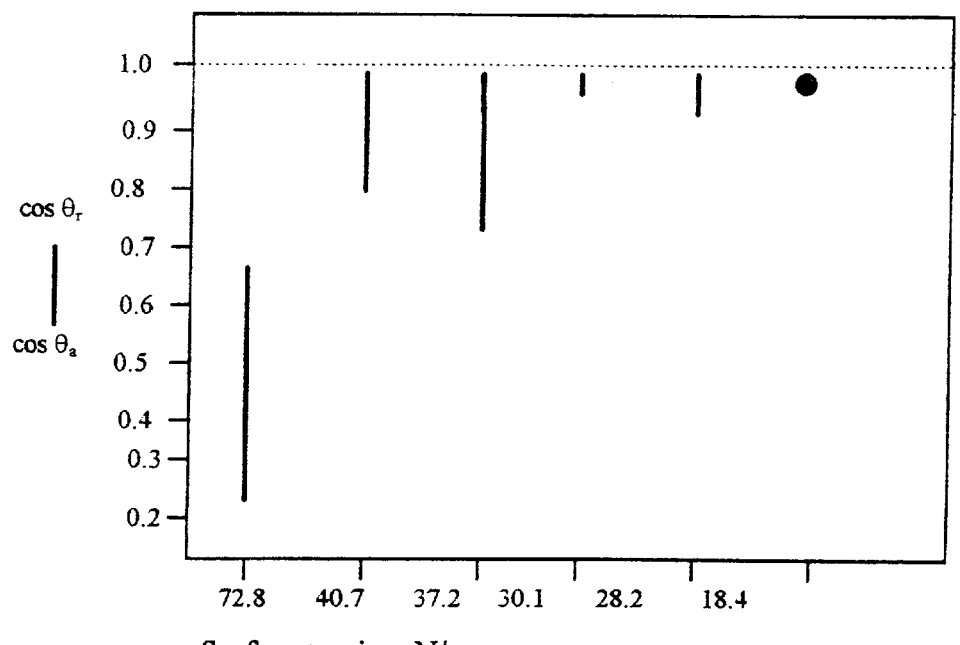

The hysteresis spectra of a cured silicone polyester top coat is also given in FIG. 23. The values of $\theta_a$ and $\theta_r$ for the two polar liquids (water and NMP) increased (better wettable) compared with those for both primer coatings. This was to be expected, since the top coat polyester was synthesised from a short-chain diol and carboxylic acid. As a result the repeating ester groups were not separated by long hydrocarbon chains. The polar ester linkage coupled with the polar melamine crosslinker contributed to wettability.

While it is more accurate to relate the length of each spectrum to hysteresis due to roughness of the bare metal as evidenced by AFM images, surface heterogeneity would explain better the hysteresis differences shown in FIGS. 21 and 22. Independent AFM surface analysis of the coatings did not show much roughness.

Most contact-angle studies involve measurements of materials in the solid state. In the field of adhesives, the adhesive is mostly solvent-free and, as a result, initial intimate contact of the adhesive and the adherent is dependent on the wetting property of the adhesive itself before setting. In surface coatings, however, with the exception of powder coatings, paints are supplied in suitable solvents as carriers. As a result, interpretation of a contact-angle study is a problem because of preferential adsorption. Further complications arise since the solvents used to dilute the paint are of different molecular species with different adsorption properties[31]. The lower surface tension of the solvent compared with that of the actual polymer will result in instantaneous preferential adsorption of the solvent to the metal interface. This can change because of the multiple attachments of which polymers are capable. With miscible blends of polystyrene and poly(vinyl methyl ether), Bhatia et al.[32] observed the preferential adsorption of the low-surface-tension PVME onto an aluminium surface. Munch and Gast[33] studied the surface adsorption of block co-polymers and concluded that adsorption concentration is dependent on surface attraction, the length of the block and the solvent co-polymer compatibility. For a homopolymer in solution, the spreading of the two components (polymer and solvent) to the metal surface depends on the interfacial surface tension between the three components.

$\gamma$PS=Interfacial surface tension between the solvent and the polymer $\gamma$PM=Interfacial surface tension between the polymer and the metal $\gamma$SM=Interfacial surface tension between the solvent and the metal Thus if $\gamma$PM+$\gamma$PS$\leq$$\gamma$MS, then the polymer wets the metal and the metal adsorbs the polymer with the exclusion of the solvent.

Adsorption of polar polymers at polar surfaces can change from an initial loop structure to a more compact flat covering, and depends on the available energy per segment, the concentration of the polymer and the duration of the test[34]. Polymer chains lose their entropy during adsorption [35] and, except for oligomers or very dilute solutions, the adsorbed polymer layer is almost always a multilayer and irreversible[34–35].

A crystalline metal has a high molecular or atomic density, and hence different surface free energy. The structure of the grain boundary at the zinc layer has a profound effect on hysteresis. Because of the grain difference, the surface is heterogeneous and has a different wetting property. On heterogeneous surfaces the advancing contact angle is sensitive to the less wettable surface (low surface energy) while the receding contact angle is more sensitive to the more wettable part. This means that the advancing contact angle "directly" shows the surface energy condition whereas a receding contact angle shows the surface energy condition of the already wetted surface[36].

The results of the contact-angle study of the primer and the top coat did not fully explain the observed good intercoat adhesion due to partial curing of the primer and chemical coupling with the top coat.

References

1. Y. L. Chen and Y. Chen, *J. Appl. Polym. Sci.,* 46, 435–443 (1992)
2. K. Frisch and D. Klempner, in: Comprehensive Polymer Science, Pergamon Press Plc, 5, 422 (1989)
3. P. Bruins, Polyurethane Technology, Interscience Publishers, 1969
4. Y. Lee et al., *Polymer International,* 28, 157–162 (1992)
5. B. Kim and J. Lee, *Polymer,* 37(3), 469–475 (1996)
6. S. Visser and S. Cooper, *Polymer;* 33(5), 920–928 (1992)
7. Lorenz and K. Hick, *Angew. Makromol. Chem.,* 72, 115 (1978)
8. R. Hunter, Zeta Potential in Colloid Science, Principles and Application, Academic Press, London 1985
9. M. Yaseen and W. Funke, *Surface Coatings International,* 61, 284–291 (1978)
10–11 R. M. Silverstein et al., Spectrometric Identification of Organic Compounds, 5th Edn., John Wiley and Sons, Inc, 91–164 (1991)
12–13 M. Grayson and E. Griffith, Topics in Phosphorus Chem., Interscience Pub., 6, 258 (1969)
14. T. Speckhard and S. Cooper, *Rubber Chem. Tech,* 59(3), 405–429, (1986)
15. J. Miller et al., *Macromolecules,* 18, 32–44 (1985)
16. G. Senich and W. MacKnight, *Macromolecules,* 13, 106–110 (1980)
17. W. D. Bascom, *Adv. Polym. Sci.,* 85, 89–124 (1988)
18. D. Briggs and D. Rance, in: Comprehensive Polymer Science, Pergamon Press Plc, 2, 710–711 (1989)
19. W. A. Zisman, *J. Paint Technol.,* 44(564), 42–57 (1972)
20. J. Baghdachi, *J. Coatings Technol.,* 69(870), 85–91 (1997)
21. W. C. Wake, Adhesion and the Formulation of Adhesives, Appl. Sci, Publishers, London, 55 (1976)
22. Reference 20
23. J. R. Dann, *J. Colloid Inter. Sci,* 32, 302–331 (1970)
24. R. Johnson and R. Detree, *J. Colloid Inter. Sci.,* 62(2), 205–212 (1977)
25. T. Kasemura et al., *Polymer,* 37(16), 3659–3664 (1996)
26. F. du Toit, PhD Thesis, University of Stellenbosch, South Africa, Dec. 1995.
27. R. Sedev et al., *J. Colloid Interface Sci.,* 159, 392–399 (1993)
28. R. Hayes and J. Ralston, *J. Colloid Interface, Sci.,* 159, 429–438 (1993)
29. R. Good et al., *J. Colloid Interface Sci.,* 35, 314 (1971)
30. J. Park and J. Kim, *J. Colloid Interface Sci.,* 168, 103–110 (1994)
31. I. Prigogine and A. Bollemans, in: Adhesion and adsorption of Polymers, Polym. Sci. and Technol., Plenum Press, N.Y., 12A, 9 (1980)
32. Q. Bhatia et al., *Macromolecules,* 21, 2166–2175 (1988)
33. L. Munch and A. Gast, *Macromolecules,* 21, 1366–1372 (1988)
34. H. Elias, in: Ullmann's Encyclopaedia of Industrial Chem., VCH Verlagsgesellschaft mbH D-6940, Weinheim, FRG, A20, 610 (1992)
35. W. Adamson, Physical Chemistry of Surfaces, Wiley and Sons, Chapter 6 (1990)
36. M. Mora et al., *Adv. Colloid Interface. Sci.,* 32, 79–116 (1990)
37. I. Miles and S. Rostami, Multicomponent Polymer System, Longman Group, UK Chapter 10 (1992)
37b. C. Tottle, in: Materials and Technology, Longman J-II, de Busy, 3, Chapter 10 (1970)
38–40 T. Yu et al., *J. Phys. Chem.,* 99, 7613–7620 (1995)
41. C. Lin and P. Lin, *Ind. Eng. Chem. Res.* 32, 818–825 (1993)
42. C. Lin et al., *Ind. Eng. Chem. Res.,* 31, 424–430 (1992)
43. References 38–40.
44. W. Funke, *Surface Coatings International* 9, 229–323 (1985)
45. Y. Chuang and C. Lin, Proceedings $22^{nd}$ Water Borne, High Solids and Powder Coatings Sym, New Orleans 554–563 (1995)
46. R. Schwenz and R. Moore, Physical Chem., Developing a Dynamic Curriculum, American Chem. Soci., 51–63 (1993)
47. T. Kasemura et al, *Polymer,* 37(16), 3659–3664 (1996)

What is claimed is:

1. A segmented non-crosslinked polyurethane resin which is dispersible in water, the polyurethane resin comprising a reaction product of:

a first component comprising at least one phosphated polyester polyol containing at least one covalent C—P bond, the phosphated polyester polyol being a hydroxyl-terminated, phosphated polyester polyol which is a reaction product of at least one carboxylic acid, at least one polyol and 2-phosphonobutane-1,2,4-tricarboxylic acid;

a second component comprising at least one polyisocyanate; and a third component comprising at least one stabilising monomer having at least one salt-forming group.

2. A resin as claimed in claim 1, in which the carboxylic acid is a $C_6$–$C_{10}$ polycarboxylic acid having two reactive COOH groups per molecule.

3. A resin as obtained in claim 2, in which the polycarboxylic acid is selected from the group consisting of 1,4-cyclohexanedicarboxylic acid, hexanedioic acid, isophthalic acid, sebacic acid, azelaic acid, and mixtures thereof.

4. A resin as claimed in claim 1, in which the polyol is a $C_4$–$C_8$ polyhydric alcohol having at least two reactive primary OH groups per molecule.

5. A resin as claimed in claim 4, in which the polyhydric alcohol is selected from the group consisting of 2,2-dimethyl-1,3-propane diol, 2-methyl-1,3-propane diol, 1,6-hexanediol, 1,1,1-tris(hydroxymethyl)propane, and mixtures thereof.

6. A resin as claimed in claim 1, in which the hydroxyl-terminated, phosphated polyester polyol is a reaction product of 25–45% m/m of the carboxylic acids(s), 40–53% m/m of the polyol(s), and 5–20% m/m of the 2-phosphonobutane-1,2,4-tricarboxylic acid, the mass percentages being based on total solids of the reactants.

7. A resin as claimed in claim 1, in which the hydroxyl-terminated, phosphated polyester polyol has an acid number in the range 5–20 KOH/g and a hydroxyl number in the range 130–180 KOH/g.

8. A resin as claimed in claim 1, in which the stabilising monomer is a polyol and the salt-forming group is a carboxylic acid group.

9. A resin as claimed in claim 8, in which the polyol is 2,2-dimethylol propionic acid.

10. A resin as claimed in claim 1, which is the reaction product of 60–80% m/m of the phosphated polyester polyol, 15–25% m/m of the polyisocyanate, and 3–8% m/m of the stabilising monomer, the mass percentages being based on total solids of the reactants.

11. A resin as claimed in claim 1, which has a number average molecular mass of 8,000–10,000.

12. A method of preparing a segmented non-crosslinked polyurethane resin which is dispersible in water, which method comprises the steps of reacting together a first component comprising at least one phosphated polyester polyol containing at least one covalent C—P bond, the phosphated polyester polyol being a hydroxyl-terminated, phosphated polyester polyol which is a reaction product of at least one carboxylic acid, at least one polyol and 2-phosphonobutane-1,2,4-tricarboxylic acid; a second component comprising at least one polyisocyanate, and a third component comprising at least one stabilising monomer having at least one salt-forming group.

13. A method as claimed in claim 12, which comprises reacting together the first, second and third components and a fourth component comprising at least one chain extender.

14. A composition comprising a resin as claimed in claim 1, and a liquid carrier for the resin, in which the liquid carrier is water and the composition is in the form of an aqueous dispersion comprising the resin dispersed in the water.

15. A composition as claimed in claim 14, in which the salt-forming groups of the resin are neutralised to salt form prior to dispersion of the resin in the water.

16. A metal primer comprising a composition as claimed in claim 15, and a crosslinking agent.

17. A metal primer as claimed in claim 16, in which the crosslinking agent is an alkoxylated melamine derivative.

18. A method of protecting a metal substrate from degradation by atmospheric elements which comprises treating the metal substrate with at least one coat of a metal primer as claimed in claim 17.

19. A composition as claimed in claim 14, which has a particle size in the range 50–150 nm and a particle size distribution in the range 1.02–1.29.

20. A composition as claimed in claim 15, in which the salt-forming groups of the resin are neutralised with a volatile amine.

21. A resin as claimed in claim 1, which is the reaction product of the first, second and third components and a fourth component comprising at least one chain extender.

* * * * *